United States Patent [19]

Berecz

[11] Patent Number: 5,393,182

[45] Date of Patent: Feb. 28, 1995

[54] SEAL NUT

[75] Inventor: Imre Berecz, Coto De Caza, Calif.

[73] Assignee: Microdot Inc., Fullerton, Calif.

[21] Appl. No.: 141,792

[22] Filed: Oct. 25, 1993

[51] Int. Cl.⁶ ............................................. F16B 33/00
[52] U.S. Cl. ................... 411/369; 411/533; 411/542; 411/900
[58] Field of Search ............... 411/302, 303, 368, 369, 411/427, 432, 531, 533, 542, 900, 915

[56] References Cited

U.S. PATENT DOCUMENTS

| | | | |
|---|---|---|---|
| 2,396,005 | 3/1946 | Gross | 411/915 |
| 3,262,722 | 7/1966 | Gastineau | 411/533 |
| 3,550,498 | 12/1970 | Briles | 411/915 |
| 4,367,060 | 1/1983 | Berecz | 411/303 |
| 4,621,961 | 11/1986 | Gulistan | 411/533 |
| 4,869,633 | 9/1989 | Hayashi | 411/900 |
| 4,986,712 | 1/1991 | Fultz | 411/533 |

FOREIGN PATENT DOCUMENTS

| | | | |
|---|---|---|---|
| 1011729 | 6/1952 | France | 411/432 |
| 3903780 | 8/1990 | Germany | 411/542 |

*Primary Examiner*—Flemming Saether
*Attorney, Agent, or Firm*—Lyman R. Lyon

[57] ABSTRACT

A three piece seal nut comprises an aluminum base having a workpiece engaging surface with an elastomeric seal ring thereon and an annular titanium torque accepting wrench pad that is seated on said base and has a threaded bore for the acceptance of a bolt.

2 Claims, 1 Drawing Sheet

5,393,182

SEAL NUT

BACKGROUND OF THEE INVENTION

The present invention relates generally to fluid sealing nuts and more particularly to a relatively lightweight fluid sealing nut. The disclosed seal nut is an improvement on the seal nut disclosed in U.S. Pat. No. 4,367,060, which is assigned to the assignee of the instant application.

Titanium seal nuts are used in the aircraft industry to fasten components that are highly loaded and must be fluid tight. Such nuts generally comprise an annular internally threaded nut body having a deformable sealing ring disposed in a counter bore positioned in the load bearing surface of the nut. The sealing ring generally protrudes below the bearing surface of the nut so that when the nut is torqued down against a workpiece, the sealing ring is both axially compressed and deformed radially inwardly against the shank or threads of the bolt, thereby forming a fluid tight seal.

Since thousands of such seal nuts are used on each airframe, weight of the individual nut is of prime concern. Obviously, however, any reduction in weight of the nut must be accomplished without compromising strength or structural integrity of the nut.

SUMMARY OF THE INVENTION

The present invention relates to a new and improved seal nut that utilizes a two-piece body that minimizes weight without reducing strength, structural integrity or sealing capability of the nut. Specifically, the nut utilizes a titanium torque receiving wrench pad that transfers load through an aluminum base to a workpiece. A seal ring is disposed in a complementary truncated conical bore in the base portion of the nut.

DETAILED DESCRIPTION OF THE PREFERRED EMBODIMENT(S)

Figure 1:
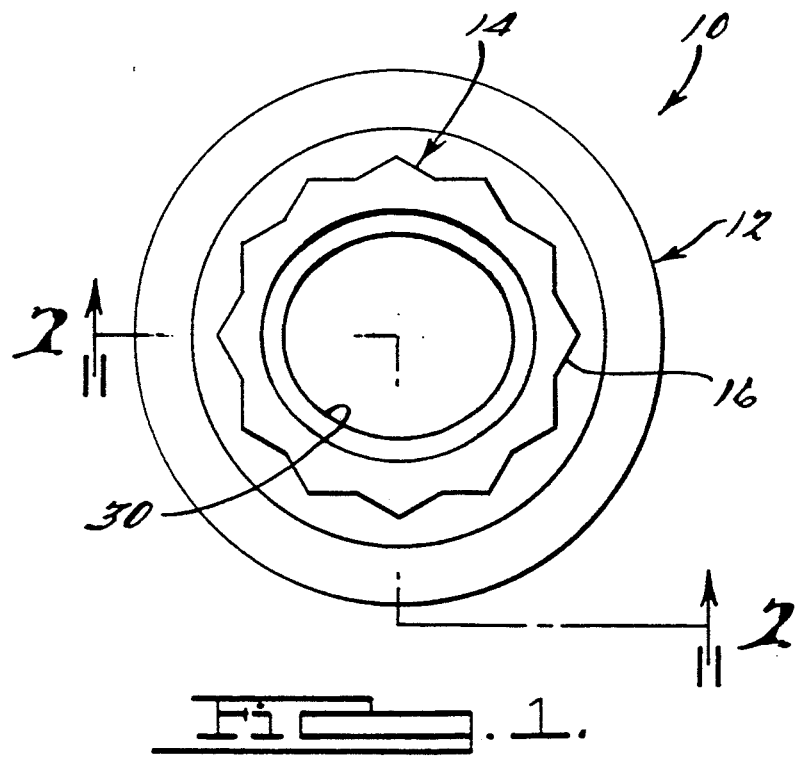
FIG. 1 is a top plan view of a seal nut in accordance with the present invention.
Figure 2:
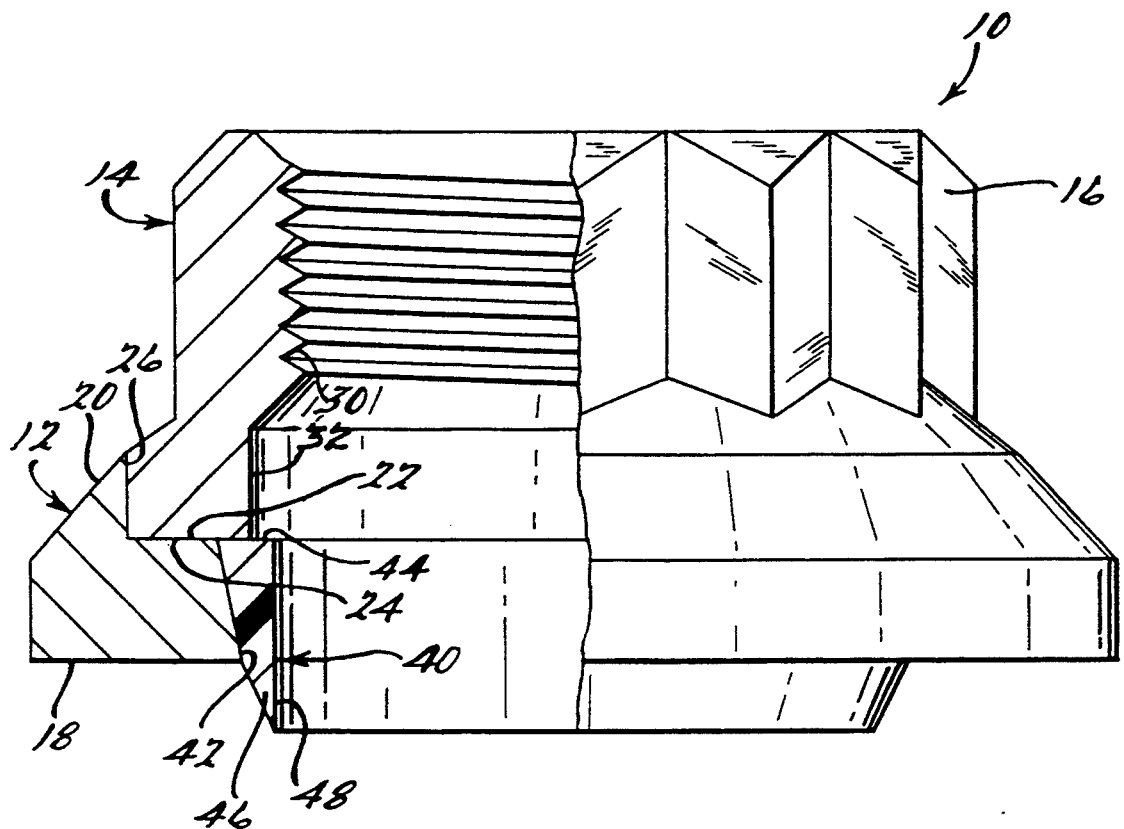
FIG. 2 is a cross-sectional view taken along the line 2—2 of FIG. 1.

A seal nut 10, in accordance with a preferred constructed embodiment of the present invention, comprises an aluminum base 12 upon which a titanium torque receiving wrench pad 14 is superimposed. The torque receiving wrench pad 14 typically contains a plurality of driving flats 16 adapted to be accepted in a complementary wrench (not shown). As seen in FIG. 1, the wrench pad 14 is deformed into an elliptical configuration to effect a prevailing torque lock on a bolt (not shown).

The base 12 of the nut 10 includes a flat annular workpiece engaging surface 18 of larger diameter than the torque receiving section 14. The base 12 has an upstanding flange 20 that surrounds a radially inwardly extending load transfer surface 22 on the base 12. The torque receiving wrench pad 14 has a lower end face 24 that is seated on the load transfer surface 22 of the base 12. A vertically extending radially inner wall 26 of the flange 20 on the base section 12 positions and retains the wrench pad 14. The torque receiving wrench pad 14 of the nut 10 has an internally threaded bore 30 that terminates in an enlarged counter bore 32 to provide clearance for the shank of a bolt (not shown).

A seal ring 40 is disposed in a truncated conical bore 42 in the base 12, an upper end face 44 of the seal ring 40 engaging the lower end face 24 of the torque receiving wrench pad 14 of the nut 10. Upon torquing of the nut 10 against a workpiece (now shown) an axially extending lip portion 46 of the seal ring 40 engages the workpiece in sealing relation. Preferably, the seal ring 40 has a bore 48 therein of a diameter complementary to a bolt (not shown) whereby the seal ring 40 expands radially inwardly upon engagement of the nut 10 with the workpiece.

In accordance with the present invention, weight of the nut 10 is reduced without reducing the structural integrity thereof by utilizing the high strength characteristics of titanium for the torque receiving wrench pad 14 of the nut 10 in combination with the relatively lightweight aluminum base portion 12. Strength of the nut 10 is maintained by placing the aluminum base portion 12 solely in compression when a workpiece is engaged, thereby maximizing the ability of the nut 10 to withstand loads placed thereon.

The saving in weight by utilizing the aluminum base 12, as opposed to making the entire nut 10 from titanium, amounts to a relatively small percentage of the weight of an all titanium nut when a single nut is considered. However, the weight saving on a large commercial aircraft is significant.

While the preferred embodiment of the invention has been disclosed, it should be appreciated that the invention is susceptible of modification without departing from the scope of the following claims.

I claim:

1. A seal nut comprising:
   an aluminum base having a planar radially extending workpiece engaging surface and a planar radially extending load transfer surface axially spaced and parallel to said workpiece engaging surface, said base having a truncated conical central bore that is divergent in the direction of the load transfer surface thereon;
   an annular titanium torque accepting wrench pad having a planar load transfer face seated on the load transfer surface of said base and having a threaded central bore for the acceptance of a bolt, compression load from the bolt on said wrench pad being transferred by the load transfer face thereon to the load transfer surface on said base; and
   an elastomeric seal ring disposed in the central bore of said base and having an end face of a diameter greater than the diameter of the central bore in said wrench pad so as to be engageable by the load transfer face on the wrench pad of said nut whereby compression loads on said wrench pad are concomitantly transferred directly to said base and to said seal ring.

2. The seal nut of claim 1 wherein said base has a radially outer axially extending wall portion for positioning and retaining said wrench pad.

* * * * *